Figure 1:
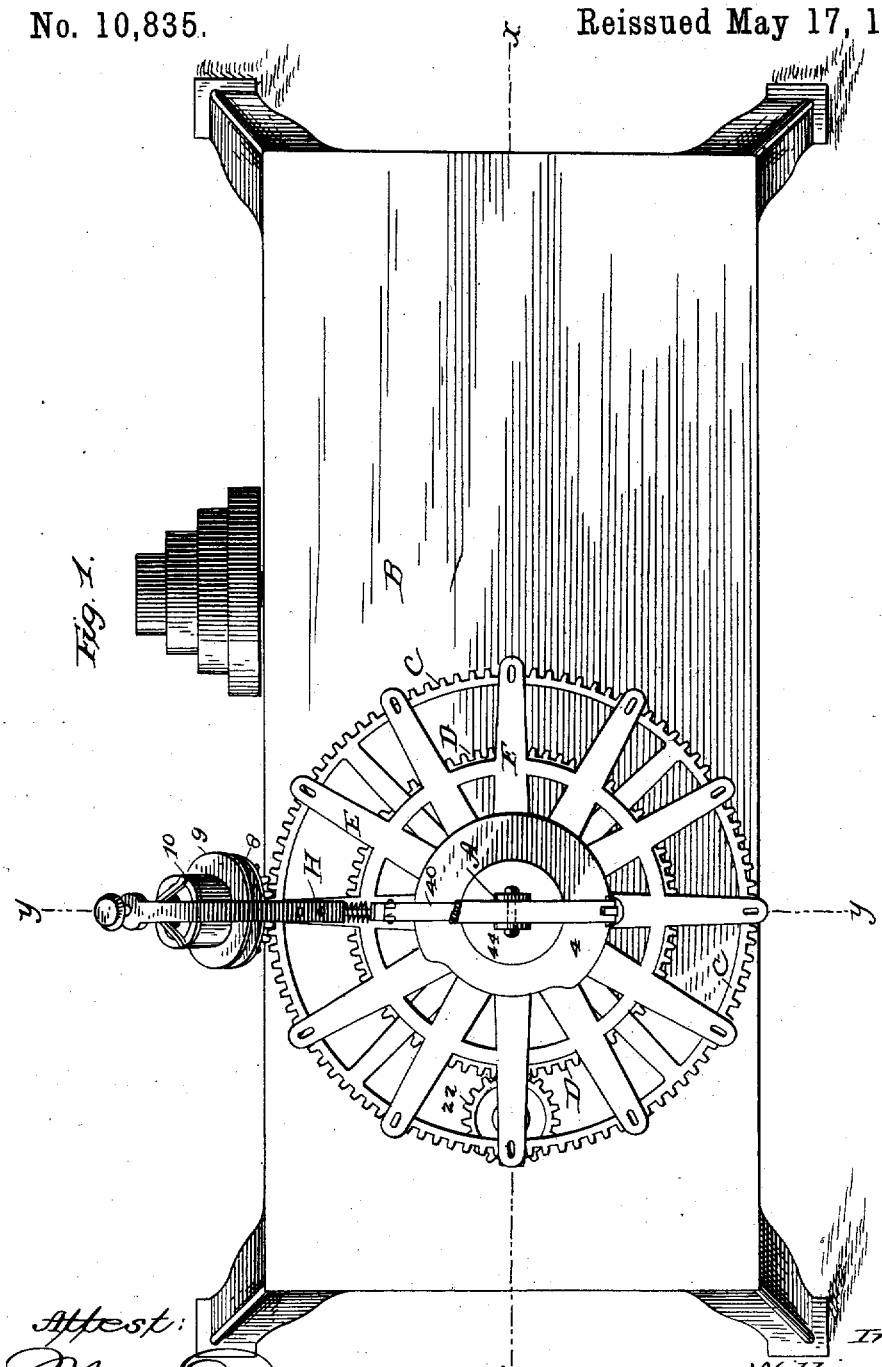

4 Sheets—Sheet 1.

W. D. BROOKS.

Assignor to himself and D. D. MALLORY.

CAN SOLDERING MACHINE.

No. 10,835. Reissued May 17, 1887.

Attest:

Walter Duncan

F. L. Middleton

Inventor

William D. Brooks by Ellis Spear

Atty.

N. PETERS, Photo-Lithographer, Washington, D. C.

4 Sheets—Sheet 2.

W. D. BROOKS.

Assignor to himself and D. D. MALLORY.

CAN SOLDERING MACHINE.

No. 10,835. Reissued May 17, 1887.

Attest:
Walter Donaldson
F. L. Middleton

Inventor
William D. Brooks
by Ellis Spear
Atty.

N. PETERS. Photo-Lithographer, Washington, D. C.

W. D. BROOKS.

Assignor to himself and D. D. MALLORY.

CAN SOLDERING MACHINE.

No. 10,835. Reissued May 17, 1887.

Attest
Walter Donaldson
F. L. Madlton

Inventor
Wm D. Brooks
by Ellis Spear
Atty.

N. PETERS, Photo-Lithographer, Washington, D. C.

W. D. BROOKS.

Assignor to himself and D. D. MALLORY.

CAN SOLDERING MACHINE.

No. 10,835. Reissued May 17, 1887.

Attest.
Walter Malason
F. L. Middleton

Inventor
Wm. D. Brooks
by Louis Spear
Atty.

N. PETERS. Photo-Lithographer, Washington, D. C.

UNITED STATES PATENT OFFICE.

WILLIAM D. BROOKS, OF BALTIMORE, MARYLAND, ASSIGNOR TO HIMSELF AND D. D. MALLORY, OF SAME PLACE.

CAN-SOLDERING MACHINE.

SPECIFICATION forming part of Reissued Letters Patent No. 10,835, dated May 17, 1887.

Original No. 234,948, dated November 30, 1880; Reissue No. 10,141, dated June 27, 1882. Application for present reissue filed April 21, 1887. Serial No. 235,698.

*To all whom it may concern:*

Be it known that I, WILLIAM D. BROOKS, of Baltimore, in the State of Maryland, have invented a new and useful Improvement in Can-Soldering Machines; and I do hereby declare that the following is a full, clear, and exact description of the same.

This invention is an improvement on that class of can-soldering machines in which a series of cans is carried on a revolving table, and in which the cans are brought in succession to the workman to be soldered.

In the machines of this class heretofore made it has been deemed necessary to tip the can during the application of the flame, and to rotate it only while so tipped, the can, after the melting of the solder by the flame and its distribution around the joint by the rotation, being returned to its upright position. As the time of rotation of the can was thus made necessarily very brief, the return of the can to an upright position took place before the solder had cooled, and the spread of said solder, caused by rotation in inclined position, was liable not to be uniform and perfect. Further, the mechanism for intermittently rotating the cans was liable to work imperfectly, and was more or less complicated.

My object therefore has been in this invention to obviate these objections, and, further, to render the apparatus more simple and more certain in its operation in other respects.

My invention therefore consists, first, in a can-soldering machine in which a series of cans is made to revolve intermittently in order to bring them in succession to the flame, while each can has a continuous rotary movement in an inclined position throughout its whole revolution, whereby the solder is made to spread uniformly, and is kept also at the joint, and not permitted to flow away from the joint upon the bottom of the can.

It consists, further, in special mechanisms whereby the movements required for the general object are effectually carried out; and, finally, in an improved construction of the can-support, whereby the flame is more effectually applied to the can.

Figure 2:
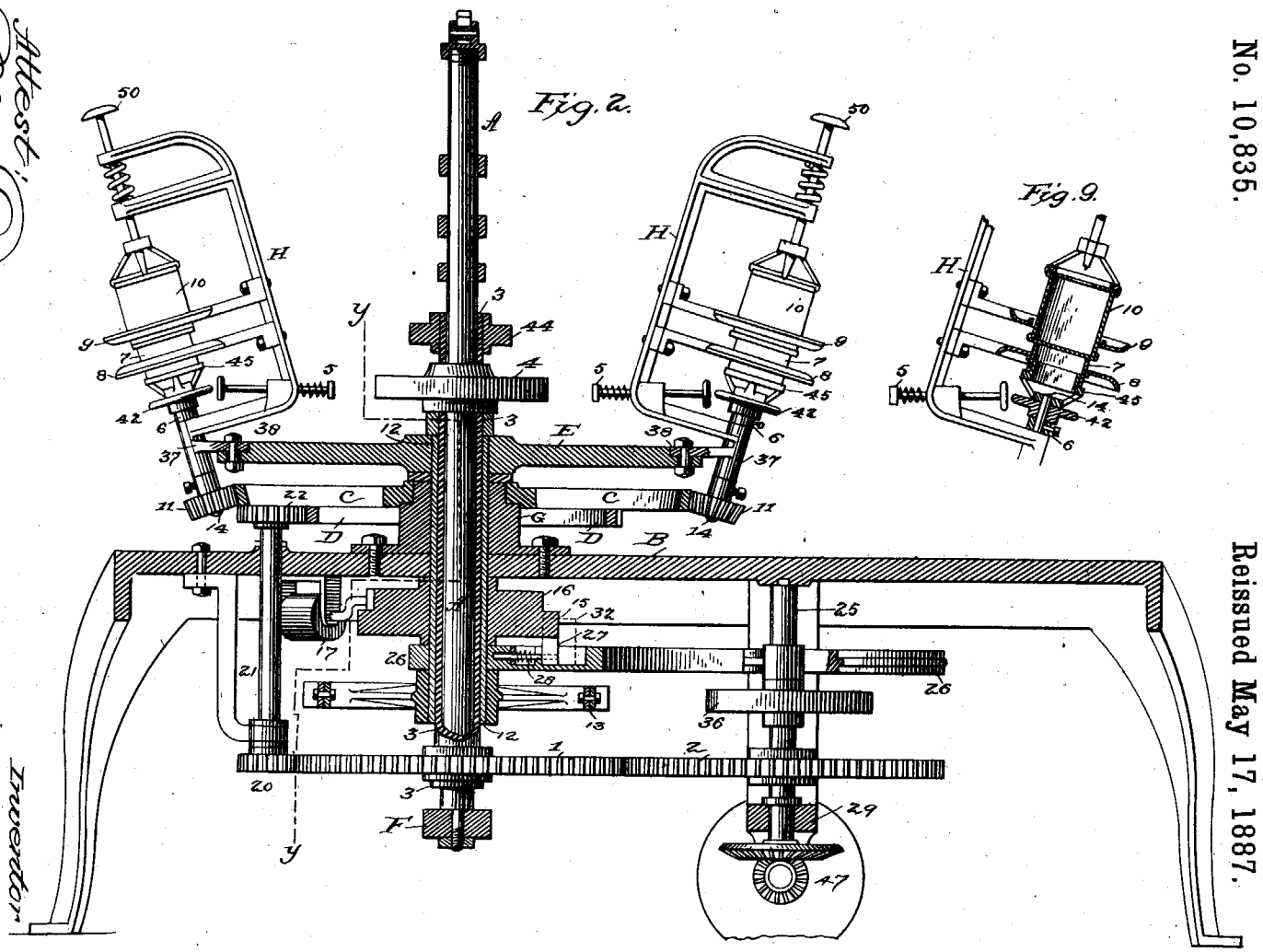
Figure 3:
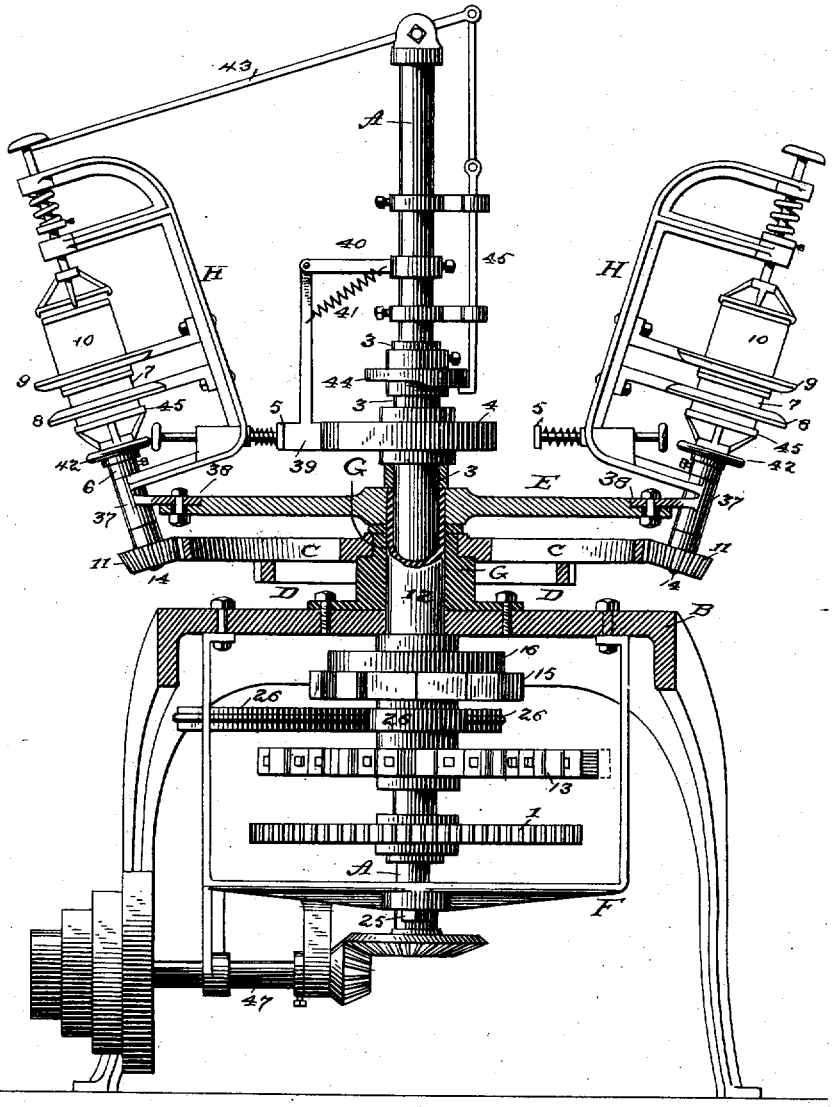
Figure 7:
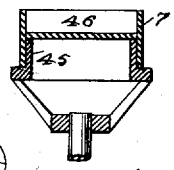
Figure 8:
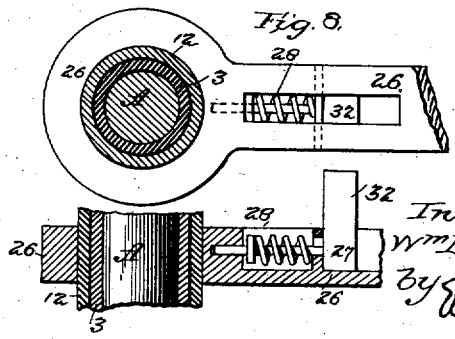

In the drawings, Figure 1 represents a plan view of the table, with the revolving wheel which carries the cans and a single can-support. Fig. 2 represents a central longitudinal section of the table on line *x x* of Fig. 1, and driving mechanism, some of the parts being in side elevation. Fig. 3 shows a transverse section of the table on line *y y*, Fig. 1, the mechanism being shown nearly all in side elevation. Figs. 4, 5, 6, 7, and 8 represent details of construction. Fig. 9 is a section showing can-holding devices.

Figure 4:
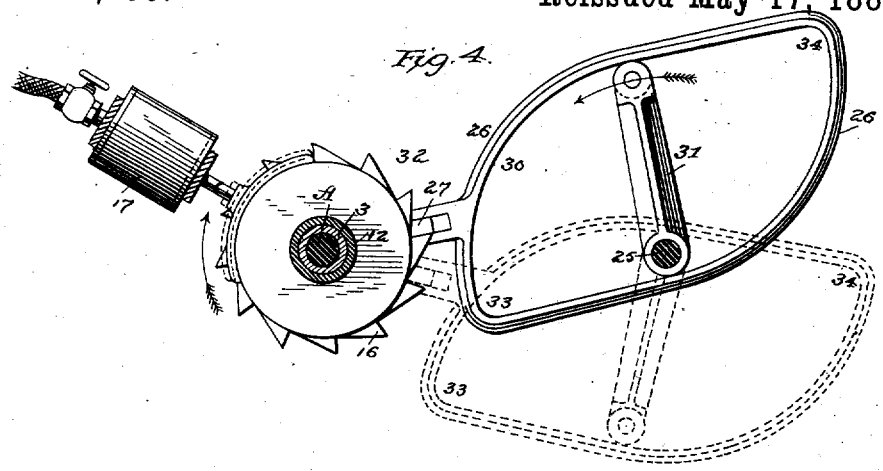
Figure 5:
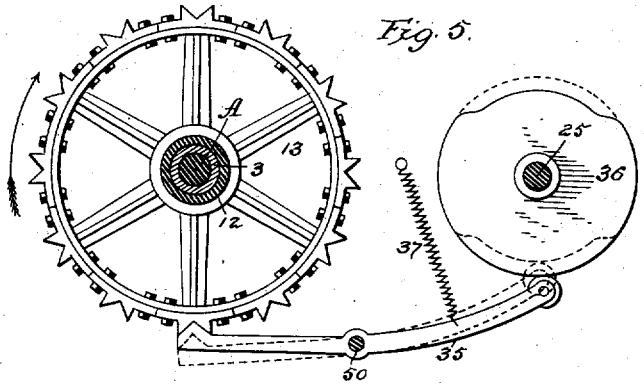
Figure 6:
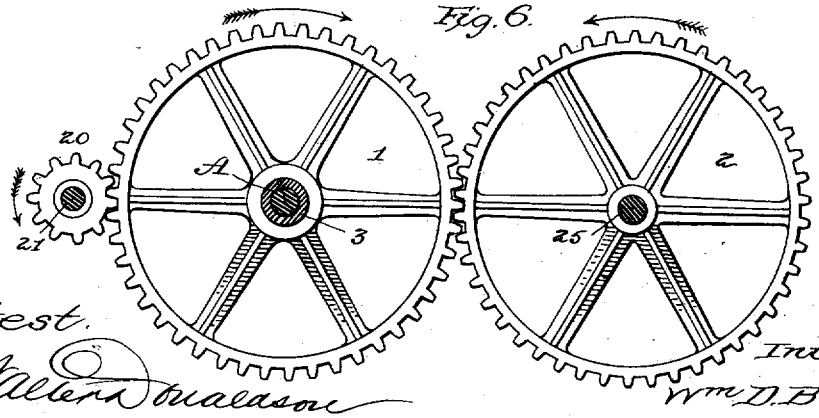

In the table B is set a post, A, the lower end of which is fixed in a bar, F, supported by arms from the table. This post does not rotate, but serves only as a support to the other working parts, as in my former patent, No. 228,864, June 15, 1880. It passes through the table and through a guiding and steadying collar, G, fixed to the top of the table. Upon this shaft or post are placed two sleeves, 3 and 12, the inner one, 3, of which terminates just above the cross-bar F, and is provided with a gear-wheel, 1, by means of which it is driven. On its upper end it carries a cam, 4, the office of which is to operate the brakes 5, as hereinafter explained. The outer sleeve, 12, carries the wheel E or hub with radial arms, on which the cans are supported. Near its lower end is a ratchet-wheel, 15, Figs. 2 and 4, by means of which an intermittent rotary movement is imparted to the wheel E. The mechanism by which this ratchet-wheel is moved is shown more clearly in Fig. 4. A lever, 26, is pivoted on the outer sleeve just below the ratchet-wheel. It is provided with a pawl, 27, which slides in a groove in the lever, and is drawn inward by a spring, 28, so that its upwardly-projecting end 32, Fig. 8, comes in contact with the teeth of the ratchet-wheel. (See also 27, Fig. 4.) The lever 26 is provided with a cam-shaped loop, 30, and is moved by an arm, 31, fixed on the shaft 25, the end of which moves in contact with the inner periphery of the loop. The shaft 25 is supported by a cross-bar, 29, Fig. 2, secured to the main frame. The arm 31 travels in the direction of the arrow, as shown in Fig. 4. Supposing the cam-lever 26 and crank 31 to be in the position indicated in dotted lines in Fig. 4, the revolution of the shaft 25 in the direction of the arrow will cause a movement of the crank 31 on the inner periphery of 30. The curve or arc of 30 being parallel to that traversed by the outer end of 31, no effect is produced until 31 reaches the angle 34. Here the crank commences to act on the straight side of the loop, and to move the same into the position shown in full lines, the pawl 32 sliding (against the pressure of spring 28) back over the inclined face of one of the teeth 16 until the spring 28 draws it into the position shown in full lines, bearing on the radial face of such tooth. Continuing its movement, the outer end of 31 reaches the angle 33, where it exerts a pressure on the opposite side of the cam-loop. As the pawl 32 is now bearing squarely against the radial face of the tooth 16, the movement of the loop 30 in the opposite direction to that described will impel the wheel 15 in the direction shown by the arrow a distance equal to one-twelfth its circumference, there being twelve teeth, 16, of equal length. The wheel 15, being rigidly fixed on the sleeve 12, moves such sleeve, and with it the table E and cam-supports, which are thus given a forward impulse at each complete rotation of the shaft 25. Each revolution of the shaft 25 causes one-twelfth of a revolution of the wheel E. The movement of the shaft 25 is so timed as to move the wheel about once in five seconds, the purpose of which is hereinafter explained in connection with the can holding and rotating devices.

In order to hold the wheel 15 steadily while the arm 26 is moving back, I have provided a pawl and ratchet-wheel of peculiar construction. (Shown more clearly in Fig. 5.) The ratchet-wheel 13 is fixed on the sleeve 12, and is provided with twelve teeth having V-shaped notches, into which fits the end of a pawl, 35, pivoted on a shaft, 50, stepped in one of the bars composing the supporting-frame, the end of the pawl being made to correspond to the notch, bringing the wheel accurately into position when the pawl is forced into connection therewith. The pawl is moved intermittently by a double cam-wheel, 36, the end of said pawl, which is provided with a friction-wheel, being made to bear constantly against the surface of the cam by means of a spring, 37. The cam 36 is fixed on the shaft 25 on the same plane with the ratchet-wheel 13, and consequently moves with the arm 31. The parts are so adjusted that the pawl 35 is out of gear with the ratchet-wheel 13 while the arm 31 is in that part of its stroke which gives the motion necessary to turn the wheel 15. During the other parts, however, of the revolution of the arm 31, the pawl 35 is held by its cam-wheel in connection with the ratchet-wheel, and thus holds the said wheel steadily in place. The shape of the cam-wheel 36 is adapted to this end. The full lines represent it in one position in Fig. 5, and the dotted lines when turned half around from that position, and the position of the lever is similarly represented.

It will be observed, in connection with Fig. 4, that the ratchet-wheel 15 receives its motion from the arm 31 during about one-quarter of the revolution of the said arm. During the other three-fourths revolution of the said arm the lever 26 is either stationary or is moving backward, and during that time the ratchet-wheel 15 is not in motion. Therefore the cam-wheel 36 is made with about three-fourths of its surface high and one-fourth low, so that the pawl 35 is in gear with the notches of the wheel 13 three-fourths of the time, holding said wheel and its connections steadily in place.

In order to give steadiness to the whole motion, I have provided a friction-brake, 17, which bears upon the smooth part 16 of the periphery of the wheel 15. The brake is an ordinary pneumatic brake, which may be nicely adjusted and made to bear with a gentle force, and is specially adapted to the apparatus. This brake is shown in Fig. 2, and more clearly in Fig. 4.

Upon the radial arms of the wheel E, twelve in number, are fixed the can-supporting brackets H, two of which are shown in Figs. 2 and 3, set on opposite sides. These are set upon the arms in a manner altogether unlike any machines of this class heretofore known, being fixed and in an inclined position. The lower shank, 37, of each bracket is provided with an arm, 38, which is bolted securely to the arm of the wheel, so that the bracket has no motion whatever upon the arm, but simply moves with it in its revolution about the central post. The brackets are tipped sufficiently outward to give that inclination to the cans found necessary in soldering by this method.

Each can (indicated at 10) rests upon an annular sheet-metal can-seat, 7, and within an upper plate, 9, and is held above by a spider of ordinary form pressed down by a spring in the ordinary manner. The lower spider is loose upon the upper end of the shaft 14. A collar, 6, is fixed upon said shaft by a set-screw just underneath the tubular portion of the spider, and by bearing upon the upper end of the shank 37 holds the shaft 14 from dropping out. The lower spider is therefore connected to the shaft only by frictional contact with the collar 6; but that is sufficient, when the can is permitted to move freely, to impart a rotary motion thereto. This rotary motion is imparted to the can through the pinion 11 meshing into a gear-wheel, C, which turns freely upon the upper part of the collar G. Independent motion is imparted to this wheel C through pinions 20 and 22 on shaft 21 and through the gear-wheels 1 and 2, as shown clearly in Figs. 2 and 6, the direction of the motion being indicated by the arrows. The pinion 22 does not mesh directly into the gear-wheel C, but with gear-wheel D, which forms a part of C, or is rigidly connected thereto. The motion of the gear C is therefore in the same direction with the wheel E, but is a constant motion, and therefore tends to give the cans a continual rotation, whether the cans be at rest or in motion, in their revolution around the central post. In order, however, to arrest the rotation of the cans on the side opposite that where they are soldered, and for the purpose of removing them when finished, I have provided a cam, 4. The cam is fixed upon the inner sleeve, 3, and rotates once in about five seconds. A block, 39, is suspended from the arm 40, and held constantly against the periphery of the cam by a spring, 41. This block occupies a fixed position on the shaft exactly opposite the position of the attendant who removes the finished cans. The high part of the cam occupies about three-fourths of its periphery, and this presses the block 39 against the spring-pawl 5, and pushes it into contact with the friction-wheel 42, fixed to the lower spider. This arrests the rotation of the can long enough to allow the attendant to remove the can and put another in its place. The movement of the parts is so timed that the high part of the cam 4 strikes the block exactly when the bracket carrying the can to be removed is opposite said block.

In order that the attendant may remove the finished can, and insert an unfinished one, the upper spider must be lifted. For this purpose I have somewhat modified the lifting apparatus, having a lever, 43, pivoted in the top of the central post, and catching under a large button on the top of the spindle of the upper spider. A cam, 44, on the inner sleeve, 3, draws down the short end of this lever by means of a suitable hook-connecting rod, 45, the end of which projects underneath the lower face of the cam, as shown clearly in Fig. 3. The high part of the cam 44 is coterminous with the high part of the cam 4, and has, of course, the same revolution. It therefore lifts the spider at the same time that the brake is applied and the rotation arrested. It will be understood that this is all accomplished during the interval while the revolution of the cans about the center is arrested. This time during which the can-carrying apparatus is completely at rest is, on the general plan of movement described, a little less than five seconds, since the time of each movement must be deducted from the five seconds occupied in one revolution of the shaft 25, which gives motion to the sleeve carrying the wheel E. This, however, is ordinarily sufficient for the exchange of the unfinished can; but manifestly the speed of the machine may be varied, the relative movements remaining the same.

I have also modified the devices which hold the cans and expose a part thereof to the flame. The can is inserted in the upper plate, 9, having an opening fitted to receive it, and, projecting through said plate, rests upon a rim of thin sheet metal. (Marked 7, and shown more clearly in Fig. 7.) This rim 7 rests upon the shoulder of the ring 45, connected to the lower spider. On the top of the ring 45, and within the rim, is a removable bottom, 46, which can be inserted in case it be found necessary at any time to prevent the too rapid cooling of the bottom. This rim 7 projects through an opening in the lower plate, 8, and leaves a part of the lower edge of the periphery of the can exposed to the flame. The edges of the plates 9 and 8 are beveled, as shown in the figures, to permit the ready access of the flame.

With this apparatus I contemplate the use of four burners arranged upon the table at a distance from each other equal to the spaces passed through by the can at each movement of the apparatus, so that the can receives successive applications of the heat as it passes from point to point, being turned all the while. Instead of a ring of solder, a segment of about one-fourth of the circumference of the can is placed on the high side of the can by the attendant. As the can is constantly rotated till finished, and held always in an inclined position, the heat melts the solder, while the continued rotation in the inclined position causes it to be thoroughly distributed until cooled without the possibility of the existence of any air-holes or defects, and without any unnecessary spread of the solder upon the bottom. I am thus able to solder cans more effectually and rapidly with less solder than has heretofore been done.

The shaft by which motion is imparted to the whole apparatus is shown clearly in Fig. 3 at 47; but power may be applied in any suitable manner.

Most of the parts may be made of cast metal, and may be constructed in an economical manner.

I have described the best method of carrying out my invention; but I do not limit myself to the specific details of construction, which may be varied without departing from the spirit of my invention.

Having thus described my invention, what I claim is—

1. In a can-soldering machine, the combination of inclined can-carrying devices, mechanism for supporting and revolving them about a common axis, and mechanism for imparting to each of such devices a continuous rotation on its own axis.

2. In a can soldering machine, a wheel supporting inclined can-carrying devices, mechanism for imparting to said can-carrying devices both an intermittent revolving motion about the axis of the wheel and a continuous rotary motion about their several axes.

3. In a can-soldering machine, the combination, with a series of inclined can-carrying devices, of mechanism for imparting to said devices intermittent revolution about a common axis, and a continuous rotation of each of the series about its own axis, and a brake mechanism for arresting the revolution of the cans.

4. In a can-soldering machine, the combination of the supporting-post A, the loose sleeve 12, having the ratchet-wheel 15, means for imparting an intermittent rotary motion to such wheel 15, and the wheel E, supporting inclined brackets H.

5. In combination, the sleeve 12, the shaft A, the ratchet-wheel 15, the lever 26, having spring-pawl 32 and loop 30, and the crank-arm 31.

6. In combination, the sleeve carrying the wheel E, the pawl 32, wheel 15, and lever 26, with a ratchet, pawl, and cam for holding said wheel stationary when at rest.

7. The combination of the wheel 13 on sleeve 12, having teeth with V-shaped notches, with the pawl 35, having a correspondingly V-shaped tooth, the spring 37, and the cam 36 on shaft 25.

8. The combination of the sleeve 12, carrying wheel E, the pawl-and-ratchet mechanism for moving the same, and the brake 17, substantially as described.

9. The combination of the wheel E, carrying the inclined brackets, the cog-wheels C and D, and the shaft and pinions connecting said wheels with the wheel 1, whereby continuous rotary motion is given the can-holders, substantially as described.

10. The combination, with the wheel E, of the fixed inclined bracket H, the shaft 14, rotating in hollow shank of said bracket, the pinion 11, and the spiders, substantially as described.

11. The combination of the cam 4, suspended block 39, brake-rod 5, spring 41, and wheel 42, with the can-supporting devices, substantially as described.

12. The can-supporting rim 7, in combination with removable bottom 46, substantially as described.

In testimony whereof I have hereunto set my hand in the presence of two subscribing witnesses.

WILLIAM D. BROOKS.

Witnesses:
JOHN SOLTER,
CHAS. L. STURTEVANT.